United States Patent [19]
Gutermann et al.

[11] 3,736,957
[45] June 5, 1973

[54] INJECTOR CUTTING TORCH OR A COMBINED INJECTOR WELDING AND CUTTING TORCH

[75] Inventors: Traugott Gutermann, Ober-Roden-Waldacker; Edmund Diehl, Frankfurt/Main, both of Germany

[73] Assignee: Messer Griesheim GmbH, Frankfurt/Main, Germany

[22] Filed: Feb. 1, 1971

[21] Appl. No.: 111,195

[30] Foreign Application Priority Data

Feb. 26, 1970 Germany.....................P 20 08 971.8

[52] U.S. Cl. ...............137/604, 239/416.3, 266/23 P, 137/454.6
[51] Int. Cl. ................................................B23k 7/00
[58] Field of Search......................137/454.5, 454.6, 137/597, 604; 239/407, 416.4, 417.3, 419, 413, 416.2, 416.3, 417.5, 419.5; 48/180 P, 180 C; 266/23 P

[56] References Cited

UNITED STATES PATENTS

| | | | |
|---|---|---|---|
| 1,865,905 | 7/1932 | Hammon | 239/416.2 |
| 1,376,828 | 5/1921 | Pettis | 239/413 |
| 853,634 | 5/1907 | Harris | 239/416.4 |
| 1,217,119 | 2/1917 | Harris | 239/419 |
| 2,238,470 | 4/1941 | Jacobsson et al. | 239/419 |
| 3,445,069 | 5/1969 | Druge | 239/407 |

FOREIGN PATENTS OR APPLICATIONS 562,420   9/1923   France ...........................239/416.2

Primary Examiner—Robert G. Nilson
Attorney—Connolly and Hutz

[57] ABSTRACT

An injector cutting torch or combined injector welding and cutting torch has a valve for regulating the heating oxygen pressure and a mixing nozzle assembly wherein the axis of the mixing nozzle boring intersects the axis of the heating oxygen supply and wherein the mixing nozzle assembly and heating oxygen valve are formed as a common constructional unit.

3 Claims, 2 Drawing Figures

INJECTOR CUTTING TORCH OR A COMBINED INJECTOR WELDING AND CUTTING TORCH

BACKGROUND OF INVENTION

This invention relates to an injector cutting torch or combined injector welding and cutting torch with a valve for regulating the heating oxygen pressure and a combining or mixing nozzle assembly wherein the axis of the mixing nozzle boring forms in the combining nozzle assembly an angle to or intersects the axis of the heating oxygen supply.

Torches are known whose injectors having a mixing nozzle assembly which contains a mixing nozzle boring.

Further known is a variable head welding torch and a cutting torch (German Design Pat. No. 1,714,823), wherein the branching off of the cutting oxygen is undertaken before the heating oxygen regulating valve at the tubular handle. The design is constructionally very expensive and has parts and conduits which project past the tubular handle.

SUMMARY OF INVENTION

The object of the invention is to provide in the torch a simple regulating device for the heating oxygen, independent of the cutting oxygen.

This object is achieved according to the invention in that the mixing nozzle assembly and valve form a common constructional unit. The mixing nozzle assembly is fitted into a boring situated in the tubular handle or insert and together with the housing wall forms the annular chamber of the injector.

The annular chamber is connected by means of a narrow mixing nozzle boring with the inner chamber of the mixing nozzle assembly. The mixing nozzle assembly is closable at one point by means of the valve. The novel arrangement of the valve in the mixing nozzle assembly makes it possible easily to replace this valve together with the mixing nozzle assembly during breakdowns. Furthermore, the narrow cross-section in the area of the valve together with the narrow mixing nozzle boring in the mixing nozzle assembly offers a complete safety valve. The torch is also suitable for flame spraying and joint planing.

In an advantageous embodiment of the invention, the valve is adjustable.

In a further advantageous embodiment of the invention the valve is a cone valve whose cone angle is about 50° and whose valve assembly is a sharp uninterrupted edge. The novel cone angle cooperates with an uninterrupted guiding edge, even with a forceful pressing of the cone on the seat, there occur no markings in the cone. It is further advantageous that the mixing nozzle assembly and the activating arrangement for the valve have a common axis.

According to a further suggestion of the invention, the cutting oxygen valve is also arranged in the same common axis, preferably in the same boring.

For this arrangement, there need only be made one boring in the housing of the tubular handle, the boring gradually tapering in the direction of depth; this is very advantageous with respect to finishing technique. In addition, a space-saving design of the housing is thereby made possible, and complicated supply canals for the fuel gas and oxygen are eliminated. In an advantageous further development, it is suggested in this connection that the mixing nozzle assembly and the heating and cutting oxygen valve are to be combined in one constructional unit, whereby processing, mounting and dismantling are further simplified.

In a still further advantageous embodiment of the invention, the valve is activated by means of a shutting plug and the force initiation occurs by means of a punctiform contact surface.

In the combining nozzle assembly, the shutting plug is turnably mounted by means of a winding or threading. The shutting plug protrudes at one end beyond the outer surface of the housing and is provided with a handwheel which serves for regulating the valve. The force initiation from the shutting plug onto the valve part occurs by means of punctiform or circular contact surface; this allows the valve to be freely fitted at the valve seat and to have no rigid guideways which could lead to leaks at the valve seat.

In a still further advantageous embodiment of the invention, the shutting plug encircles the shutting plug "with play".

This equally affords a free fitting of the valve at the valve seat.

In a still further advantageous embodiment of the invention, the mixing nozzle assembly has a free chamber in the proximity of the mixing nozzle boring.

The free space makes possible a slackening during backfire and affords a considerable pressure reduction.

THE DRAWINGS

FIG. 1 shows a side view of a cutting torch in accordance with this invention; and FIG. 2 shows a sectional view of an injector of the type shown in FIG. 1.

DETAILED DESCRIPTION

Figure 1:
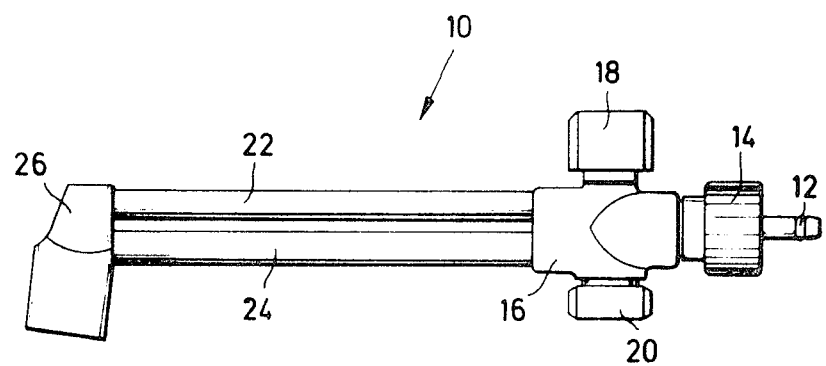
Figure 2:
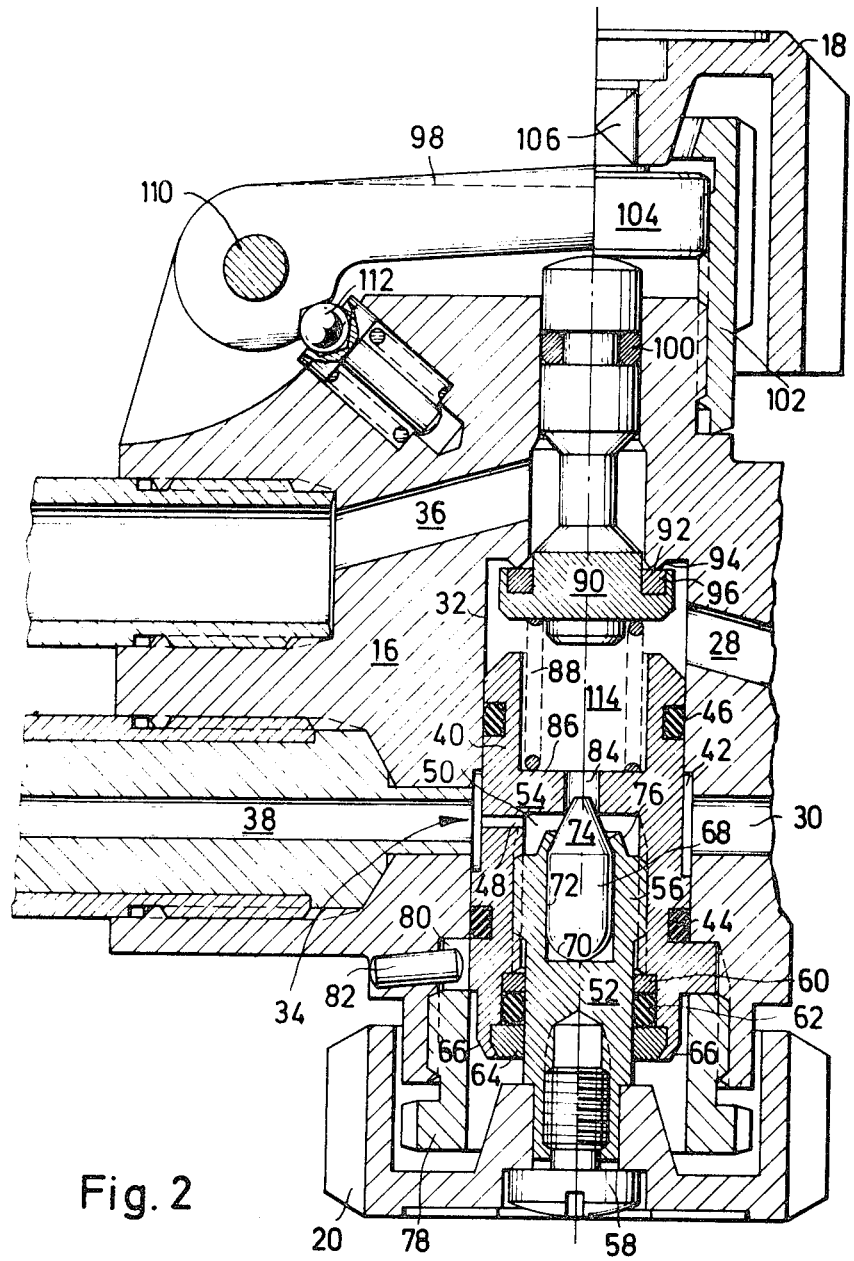

FIG. 1 shows a cutting torch 10 with a connection 12 for oxygen and fuel gas and a coupling nut 14 which serves for connecting a non-illustrated handle part. A housing has a handwheel 18 for regulating and shutting off the cutting oxygen and a handwheel 20 for regulating and shutting off the preheating or heating oxygen. Handwheel 18 may be replaced by a service lever such as shown in FIG. 2. The handwheels or service levers may be mounted at the housing in any desired arrangement.

From housing 16 are extended two pipes 22, 24 which serve for the oxygen supply or the supply of the fuel-gas-oxygen mixture to the torch head 26. Housing 16 with the service parts 18, 20 may be of one piece with the non-illustrated handle part of the torch and may be arranged there in the rear or in the front of the handle part.

FIG. 2 shows a sectional view of a housing such as housing 16 of FIG. 1. Handwheels 18 and 20 are indicated at the upper and at the lower part of the Figure. In the housing is situated a boring 28 for the oxygen and a boring 30 for the fuel gas. Angularly to these borings proceeds a further boring 32 which holds injector 34 and the individual parts further described below. Boring 32 has its largest diameter at the bottom edge of the diagram and in stages tapers toward the upper edge of the diagram, making it very easy to manufacture. From boring 32 lead out boring 36 for the cutting oxygen and a boring 38 for the fuel gas and heating oxygen mixture, which lead to the pipes 22, 24 described with respect to FIG. 1.

Injector 34 has a mixing nozzle assembly 40 whose outer side is shaped in such a way that an annular chamber 42 is formed between it and the wall of boring 32. Annular chamber 42 is sealed by means of O-rings 44, 46. A mixing nozzle boring 48 leads from the annular chamber into the interior of the mixing nozzle assembly 40. The free inner chamber 50 is bound on one side by a shutting plug 52 and on the other side by a plate piece 54 connected with the mixing nozzle assembly in one piece. The shutting plug 52 is connected turnably in a winding or threading 56 of the mixing nozzle assembly and rigidly with handwheel 20 by means of a connecting screw 58. Between shutting plug 52 and the mixing nozzle assembly there are provided for purposes of sealing a ring 60, an O-ring 62 and a further ring 64 which at its outer side is beveled in order that wall 66 of the shutting plug may be flanged over it. The shutting plug holds with play a valve member 68, which consists of a hemispherical force initiating part 70, a stem part 72, and a valve cone 74. Wall 76 of the shutting plug is not flanged in the area of the cone 74. The shutting plug 52 is mounted in the housing 16 by means of its threaded engagement with the mixing nozzle assembly which engages the threaded sleeve 78. In the wall of the mixing nozzle assembly is situated a slot 80 in which engages a pin 82 pressed into the housing 16, preventing the nozzle assembly from turning. Valve cone 74 closes off, in the position shown, a valve boring 84 in the plate part 54. Should handwheel 20 be turned, then communication or flow is created through valve boring 84 around valve cone 74.

Plate section 54 at its surface 86, together with the rim of insert 40, serves for the locking in position of a pressure spring 88, which in turn is braced against a pressure piece 90. Pressure piece 90 has a gasket-sealing washer 92, which together with a rim 94 of the housing forms a valve 96. If the pressure piece 90 is moved downwardly by means of a lever 98 or handwheel 18, washer 92 is moved away from rim 94 to open communication therethrough.

Pressure piece 90 is sealed from housing 16 by means of an O-ring 100. Threaded bushing 102 is screwed onto housing 16 (semilaterally on the right), in a threaded manner taking up plate 104 and connected rigidly with a square 106. Turning the handwheel 18 moves plate 104 downward and valve 96 opens against the pressure of spring 88. The same manner of operation is achieved with lever 98, shown semilaterally on the left. With respect to 110, the lever is turnably supported. A spring-loaded ball 112 holds lever 98 in the position "valve 96 closed." Pressure on the lever opens the communication of valve 96.

The oxygen being under pressure flows through boring 28 and, with an opened valve 96, into boring 36 and further toward the torch head. A portion of the oxygen flows through valve boring 84 as heating oxygen, when the valve cone 74 is removed from its seat, into inner chamber 50 and from there through mixing nozzle boring 48 into the annular chamber 42, where according to the injector principle it takes along fuel gas from boring 30 and is conducted to the torch head through boring 38. In flashing back, i.e. when the ignition speed is greater than flow speed, the mixing nozzle boring 48 forms a considerable resistance. Should the pressure wave pass even this resistance, it is then reduced in inner chamber 50 and in no way reaches through the sectional area freed from the valve core 74 into the chamber 114 of the pressurized oxygen.

As used in the claims the term injector cutting torch is meant to also include a combined injector welding and cutting torch.

What is claimed is:

1. An injector cutting torch having a housing and an operating head, an oxygen supply passageway and a fuel gas passageway both extending through the housing and terminating at the operating head, a boring in the housing intersecting the oxygen supply and fuel gas passageways for providing communication between these passageways, a heating oxygen valve in the boring for controlling the oxygen flowing through the boring and introduced into the fuel gas passageway, a cutting oxygen valve in the boring for controlling the flow of oxygen through the oxygen supply passageway to the operating head, and activating means for the heating oxygen valve operating along an axis common with the axis of the boring.

2. An injector cutting torch as in claim 1 wherein the activating means includes a shutting plug that surrounds the heating oxygen valve.

3. An injector cutting torch having a housing and an operating head, an oxygen supply passageway and a fuel gas passageway both extending through the housing to the operating head and being substantially parallel to one another, a boring in the housing intersecting the oxygen supply and fuel gas passageways at substantially right angles thereto for providing communication between these passages, an adjustable heating oxygen valve in the boring for controlling the oxygen flowing through the boring from the oxygen supply passageway and introduced into the fuel gas passageway, an adjustable cutting oxygen valve in the boring for controlling the flow of oxygen through the oxygen supply passageway to the operating head, and activating means for both the heating oxygen valve and the cutting oxygen valve, the activating means for both the heating oxygen valve and the cutting oxygen valve operating along the axis common with the axis of the boring.

* * * * *